United States Patent [19]
Lin et al.

[11] Patent Number: 5,608,659
[45] Date of Patent: Mar. 4, 1997

[54] METHOD FOR IDENTIFYING A MOST-PROBABLE-POINT IN ORIGINAL SPACE AND ITS APPLICATION FOR CALCULATING FAILURE PROBABILITIES

[75] Inventors: Hong-Zong Lin, Cerritos; Mohammad R. Khalessi, Fountain Valley, both of Calif.

[73] Assignee: Rockwell International Corporation, Seal Beach, Calif.

[21] Appl. No.: 228,993

[22] Filed: Apr. 18, 1994

[51] Int. Cl.$^6$ .................................................... G06F 17/10
[52] U.S. Cl. ........................................................ 364/554
[58] Field of Search .................................. 364/554, 560, 364/561

[56] References Cited

PUBLICATIONS

"Probability Concepts in Engineering Planning and Design", vol. II, pp. 333–385 Decision Risk and Reliability, Authors: A. H–S. Ang, W. H. Tang; Publisher: John Wiley & Sons.
"Methods of Structural Safety", Authors: H. O. Madsen, S. Krenk, N. C. Lind; Prentice–Hall International Series in Civil Engineering and Engineering Mechanics—pp. 44–101.
"Second–Order Reliability Approximations" by Armen Der Kiureghian, M. ASCE, H. Z. Lin & S. J. Hwang; Journal of Engineering Mechanics, vol. 113, No. 8, Aug. 1987—pp. 1208–1225.
"Rationalisation of Safety and Serviceability Factors in Structural Codes" Report 63, Jul. 1977, 'Commentary on the Level II Procedure', M. R. Horne & P. H. Price pp. 209–226.
"Distribution of Quadratic Forms in Normal Space—Application to Structural Reliability" by Lars Tvedt, Journal of Engineering Mechanics, vol. 116, No. 6, Jun. 1990 pp. 1183–1197.
"Remarks on a Multivariate Transformation" by Murray Rosenblatt, Annals on Math Stat. 1952, pp. 470–472.
"Asymptotic Approximations and Multinormal Integrals", by Karl Breitung, Journal of Engineering Mechanics, vol. 101, No. 3, Mar. 1984 pp. 357–366.
"A New Most–Probable–Point Search Procedure for Efficient Structural Reliability Analysis" by M. R. Khalessi, Y. T. Wu & T. Y. Torng Proceedings of the 32nd Structures, Structural Dynamics, and Materials Conference, Part 2, AIAA/ASME/ASCE/AHS/ASC, Apr. 191, pp. 1295–1304.

*Primary Examiner*—Edward R. Cosimano
*Attorney, Agent, or Firm*—George A. Montanye; Harry B. Field; Lawrence N. Ginsberg

[57] ABSTRACT

The present invention is a method for identifying a Most-Probable-Point (MPP) in original space obviating the need for a probability transformation, for use in first order/second order reliability analysis. It comprises generating the linear approximation of a limit-state-function, $g(x)$ about the median, mean point, or mode of random variables, x of $g(x)$. $g(x)$ is defined so that $g(x) f 0$ denotes a failure set. The Most-Probable-Point-Locus (MPPL) of $g_1$, $MPPL_1$, is constructed by the steps of: i) identifying the mode of x; ii) identifying the MPP of $g_1(x)=c$, where c is an arbitrary constant, and iii) constructing said $MPPL_1$ by connecting said mode of x from step i), above, and the MPPs corresponding to different c's from step ii), above. A quadratic search algorithm is to identify point $MPP_1$, the intersection of $MPPL_1$ and $g(x)=0$, based on the following convergence criteria:

1. $g(\bar{x}) = 0$ and,

2. $\dfrac{\Delta f_x(x)}{|\Delta f_x(x)|} = \dfrac{\Delta g(x)}{|\Delta g(x)|}$ The process is then stopped, unless the convergence criteria are not satisfied. $g_2$, the linear approximation of the limit-state-function, $g(x)$ about $MPP_1$ is generated. $MPP_{21}$, the Most-Probable-Point of $g_2(x)=0$ is located. The approximate MPPL of $g_2$, $MPPL_2$, is constructed by connecting the mode and the $MPP_{21}$. The quadratic search algorithm is used to identify point $MPP_2$, the intersection of $MPPL_2$ and $g(x)=0$ based on the convergence criteria. $g_j(x)$ is updated, where $j=2, 3, \ldots, m$, where m is the total number of steps required for convergence.

2 Claims, 4 Drawing Sheets

METHOD FOR IDENTIFYING A MOST-PROBABLE-POINT IN ORIGINAL SPACE AND ITS APPLICATION FOR CALCULATING FAILURE PROBABILITIES

BACKGROUND OF THE INVENTION

1. Field of the Invention

This invention relates to calculating failure probabilities and more particularly to a methodology that involves identifying the most-probable-point in the original X-space with an iteration procedure.

2. Description of the Related Art

Several methods of approximation for calculating failure probabilities have been developed. These methods of approximation are described in the following references:

Ang, A. H.-S., and W. H. Tang, *Probability Concepts in Engineering Planning and Design, II—Decision, Risk, and Reliability*, John Wiley & Sons, Inc., New York, N.Y. 1984.

Madsen, H. O., S. Krenk, and N. C. Lind, *Methods of Structural Safety*, Prentice-Hall, Inc., Englewood Cliffs, N.J., 1986.

Der Kiureghian, A., H.-Z. Lin, and S. J. Hwang, "Second-Order Reliability Applicatons," *Journal of Engineering Mechanics*, Vol. 113, No.8, ASCE, 1987, pp. 1208–1255.

Khalessi, M. R., Y.-T. Wu, and T. Y. Torng, "A new Most-Probable-Point Search Procedure for Efficient Structural Reliability Analysis," *Proceedings of the 32nd Structures, Structural Dynamics, and Materials Conference*, Part 2, AIAA/ASME/ASCE/AHS/ASC, April 1991, pp. 1295–1304

Breitung, K., "Asymptotic Approximations for Multinormal Integrals," *Journal of Engineering Mechanics*, Vol. 110, No. 3, ASCE, 1984, pp. 357–366.

A common algorithm in these methods involves the transformation from the original X-space to a standard, uncorrelated normal U-space. This is conducted by the probability transformation that preserves cumulative density functions (CDFs) and PDFs at the linearization points in the iteration procedure. In reliability analysis, it is necessary to carry out this probability transformation only at a finite number of linearization points. The well-known first-and-second-order reliability methods (FORM/SORM) replace the limit-state function with a tangent plane and a quadratic surface, respectively, at a point u* on the limit-state surface, known as the U-space MPP (most-probable-point), which is at the minimum distance from the origin in the standard normal space.

The advantage of FORM/SORM analyses is that the major contribution to the failure probability comes from the vicinity of u* because the probability density decays exponentially with the distance from u*. However, because the probability transformation used in the conventional FORM/SORM analyses preserves the CDF at the linearization points, the U-space MPP is inconsistent with the true MPP, x*, which has the highest probability density function (PDF) in the failure domain, when one of the distributions of the basic variables is asymmetric. That is, by inverse probability transformation, the mapping of the U-space MPP, u*, in the original space is not the true MPP, x*. This can be easily shown from the fact that the origin in the U-space, which has the highest PDF in the standard normal space, is consistent with the median point instead of the mode point in the original space for asymmetric distributions.

Moreover, a nonlinearity from the probability transformation is imposed in the limit-state function in the standard normal space. This results in extra iterations to identify the MPP if probability transformation is employed in the analysis. Therefore, for accuracy and efficiency, it is desirable to develop a methodology to identify the MPP, x*, without using the probability transformation, and using x* to calculate the reliability.

SUMMARY OF THE INVENTION

The present invention involves a new iteration procedure to identify the most-probable-point (MPP) that has the highest probability density function in the failure domain without using probability transformation and involves a method to calculate the failure probability using the X-space MPP. The proposed iteration procedure constructs the most-probably-point-locus (MPPL) of a linearized limit-state function starting from the mode and uses this MPPL to search the next linearization point. The iteration is converged to the MPP, where the contour of equal probability density function is tangent to the limit-state function, g(x), which is defined so that g(x)<0 denotes the failure set. Because probability transformation is not used in the iteration, the proposed method provides an efficient way to identify the X-space MPP.

Once the X-space MPP has been identified, the conventional first-and-second-order reliability methods can be used to compute the failure probability by using the X-space MPP and an alternative probability transformation. The X-space MPP is transformed by using the alternative probability transformation into the standard normal space and then replace the limit-state function with a polynomial at the transferred U-space MPP. The alternative probability transformation preserves the probability density function (PDF) and its tangent at the linearization point so that the transferred U-space MPP is also the highest PDF point in the failure domain in the standard normal space. The present methods require no extra computation of the limit-state function. They may be performed using a standard computer.

Other objects, advantages and novel features of the present invention will become apparent from the following detailed description of the invention when considered in conjunction with the accompanying drawings.

BRIEF DESCRIPTION OF THE DRAWINGS

The same elements or parts throughout the figures are designated by the same reference characters.

DETAILED DESCRIPTION OF THE PREFERRED EMBODIMENTS

The following nomenclature chart is provided to aid the reader:

| | |
|---|---|
| $P_f$ | probability of failure |
| $\underline{x}$ | vector of random variables |
| n | total number of random variables |
| $f_x(\underline{x})$ | joint probability density function (PDF) |
| $g(\underline{x})$ | limit-state function |
| $\nabla g(\underline{x})$ | vector of the gradient of $g(\underline{x})$ |
| $\nabla f_x(\underline{x})$ | vector of the gradient of $f_x(\underline{x})$ |
| $g_j(\underline{x})$ | linearlized limit-state function obtained by linearizing $g(\underline{x})$ at $\underline{x}_j$ |
| MPP | most-probable-point (design point) |
| MPPL | most-probable-point-locus |
| $\mu$ | mean value |
| $\underline{x}^*$ | vector of MPP |
| $\beta$ | distance to the mode in scaled X-space |
| $\epsilon_g$ | convergence tolerance in g |
| $\epsilon_\beta$ | convergence tolerance in $\beta$ |
| $\underline{x}_{j1}$ | MPP of $g_j(\underline{x}) = 0$ |
| $MPPL_j$ | MPPL of $g_j(\underline{x}) = 0$ |
| $\beta_{j1}$ | distance between $\underline{x}_{j1}$ and the mode |
| $\beta_j$ | distance from the intersection of $MPPL_j$ and $g(\underline{x}) = 0$ to the mode |
| $T_0$ | a feasible search direction |
| $\underline{x}_0$ | a starting point to find $\underline{x}_{j1}$ |
| $S$ | Search direction to find $\underline{x}_{j1}$ |
| $\alpha_0$ | $\nabla g(x_g)/|\nabla_g(x_0)|$ |
| $\Phi(u_i)$ | CDF of standard normal variable $u_i$ |
| $\phi$ | PDF of standard normal distribution |
| $\underline{x}_{i-1}$ | partial vector, $= \{x_1, x_2, \ldots x_{i-1}\}^T$ |
| $\sigma$ | standard deviation |
| $\mu'$ | equivalent mean value |
| $\sigma'$ | equivalent standard deviation |

1. Method for Identifying the X-Space MPP, x*

Determination of the X-space MPP, x*, of a limit-state function without using the probability transformation is an optimization problem with a nonlinear constraint. This problem can be represented by $$\text{maximize} \quad f_x(\underline{x}) \quad (1)$$
$$\underline{x} \in R^n$$
$$\text{subject to} \quad g(\underline{x}) = 0$$

where $R^n$ denotes the domain of the X-space.

Figure 1:
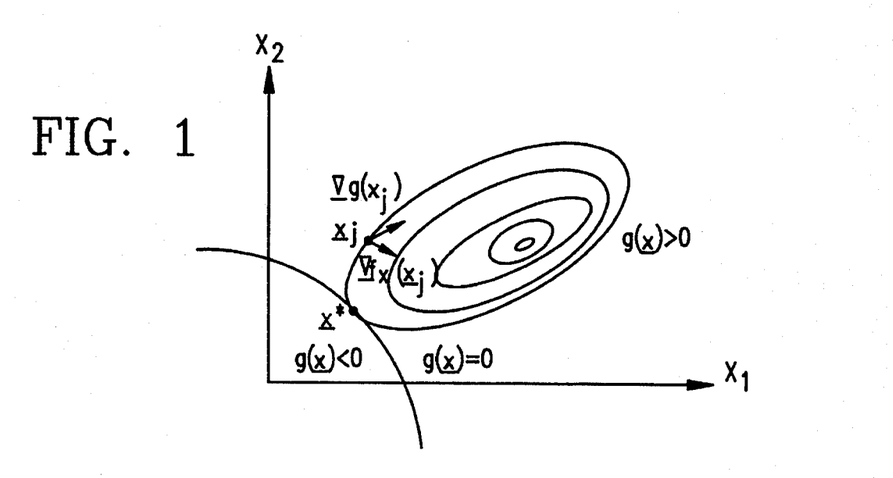
FIG. 1 is an illustration of convergence criteria for identifying the MPP x* in the original space.

Equation 1 indicates that the contour of equal probability is tangent to the limit-state surface at the MPP,x*, because x* has the highest probability density in the failure domain (FIG. 1). If all random variables are standard normal distributed, the gradient of PDF passes through the origin because the contours of equal probability are concentric hyperspheres. This conclusion coincides with the criterion used in the iteration procedure to identify the U-space MPP,u*.

A problem in the X-space approach is that the number of iterations will be affected by the units of basic random variables. An easy way to solve this problem is to scale down the dimensions by the corresponding standard deviation. This procedure does not introduce more nonlinearity in the limit-state function because it is a linear transformation. The scaled X-space, then, becomes a "standard" space with the same scale for all dimensions and the result is invariant to the units of random variables.

Because the evaluation of the limit-state function is expensive such as in finite-element-based reliability analysis used in the structural design, the iteration procedure for the identification of the MPP should require a minimal number of limit-state function calculations. A fast convergence algorithm always involves the gradient of the limit-state function (a type of steepest descent method). Calculating the gradient of the limit-state function is the major computational effort in many structural systems. Because of this, we can use the linearized limit-state function generated at the current linearization point $x_j$ to approach the solution x*. The advantage of this approach is that computational effort involved in the linearized limit-state function is trivial, since no finite-element analysis is required. The linearized limit-state function at the linearization point $x_j$ is obtained from the following equation:

$$g_j(x) = g(x_j) + \nabla g^T(x_j)(x - x_j) \quad (2)$$

By intuition, the MPP of the linearized limit-state function generated at $x_j$, denoted as $g_j(x) = g(x_j)$, is closer to x* than $x_j$. This is proved later. Finding this MPP is also an optimization problem with a linear constraint. By replacing $g(x)=0$ with $g_j(x)=g(x_j)$, Equation 1 can be used to model this problem. The variable metric method described in Philipe, E. G., M. Walter, and H. W. Margaret, *Practical Optimization*, Academic Press, Inc., San Diego, Calif., 1981, can be employed to find the MPP of the linearized limit-state function $g_j(x)=g(x_j)$. Repeating the same procedure, the MPP of the linearized limit-state function $g_j(x)=c$ can be identified, where c is a specified constant. The MPPL of a linearized limit-state function $g_j(x)$, $MPPL_j$, is then obtained by connecting the MPPs of the linearized limit-state surfaces $g_j(x)$ corresponding to different selected c. Note that the construction of $MPPL_j$ does not need the extra limit-state function as well as its gradient calculations. The computational effort required to construct this MPPL is then insignificant because the required PDF and its gradient calculations (as shown below) are minor compared to limit-state function calculation.

At the MPP of the linearized limit-state function $g_j(x)=c$, the contour of equal PDF is tangent to $g_j(x)=c$. The gradient of $g_j(x)$ is a constant and the contours of equal probability are not concentric hyperspheres in the original space if one of the basic random variables is asymmetric. Therefore, the $MPPL_j$ is a curve if one of basic random variables is asymmetric. Also, for a given linearized limit-state function $g_j(x)$, the MPPL constructed in the original space is different from the MPPL constructed in the standard normal space because of the inconsistency of the MPPs in the two spaces if the conventional probability transformation is used. Furthermore, because the mode is an MPP for any linearized limit-state function, the MPPL can constructed from the mode.

The quadratic search algorithm (see, for example, the Khalessi et al. reference previously cited) can be then used to find the $g(x)=0$ point along $MPPL_j$; that is, the quadratic search algorithm is applied to find the intersection of $g(x)=0$ and the $MPPL_j$. Once this intersection has been identified, a new linearized limit-state function is created by linearizing the limit-state function at this intersection point. This updated linearized limit-state function is then used to construct the updated MPPL. This procedure is repeated until the convergency of x* is reached.

2. Iteration Procedure for Identifying X-Space MPP, x*

As indicated in the previous section, the $MPPL_j$ of the linearized limit-state function, $g_j(x)$, is constructed through the following procedure:

1. Identify the mode that has the highest PDF in the original space.

2. Linearize g(x) at current linearization point $x_j$, i.e., $g_j(x)=g(x_j)+\nabla g^T(x_j)(x-x_j)$.

3. Identify the MPP of $g_j(x)=c$, where c is an arbitrary constant, by an optimization algorithm such as the variable metric method. (See, for example, the Philipe et al. reference previously cited.)

4. Obtain the $MPPL_j$ for $g_j(x)$ by connecting the mode and the MPPs from Step 3.

Figure 2:
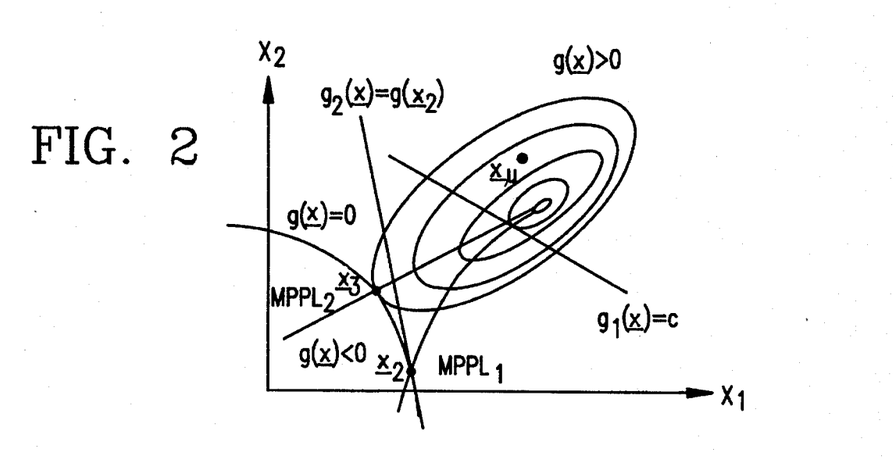
FIG. 2 is an illustration of the present iteration procedures for identifying the MPP in the original space.

The following is the proposed iteration procedures to identify the X-space MPP,$x^*$ (see FIG. 2):

1. Divide each random variable by its standard deviation.

2. Construct the first MPPL, $MPPL_1$, for the linearized g(x) at mean point $x_u$ through the above procedures.

3. Use the quadratic search algorithm to identify the intersection of g(x)=0 and $MPPL_1$. Denote this intersection point as $x_2$.

4. Establish the linearized g(x) at $x_2$, i.e., $g_2(x)=g(x_2)+\nabla g^T(x_2)(x-x_2)$.

5. Check convergence criteria (see Section 3). If convergent, stop; otherwise, continue to Step 6.

6. Approximate $MPPL_2$ as a line that passes through the mode and the MPP of $g_2(x)=0$.

7. Use the quadratic search algorithm to identify the intersection of g(x)=0 and $MPPL_2$. Denote this intersection point as $x_3$.

8. Repeat steps 4 through 7 until convergence criteria are met.

Although MPPL of the linearized limit-state-function $g_2(x)$ is also a curve, it is approximated by a straight line passing through the mode and the MPP of $g_2(x)=0$. The effect of this approximation on the search for the intersection of $MPPL_2$ and g(x)=0 is insignificant because the MPP of $g_2(x)=0$ is close to the limit-state surface. Similarly, for any linearized limit-state function with the linearization point close to the limit-state surface, its MPPL can be assumed to be a straight line passing through the mode and the corresponding MPP of the linearized limit-state function.

3. Convergence Criteria for the Iteration Procedure to Identify X-Space MPP

As mentioned in Section 1, the contour of equal probability density function is tangent to the limit-state surface at the MPP,$x^*$. In other words, $x^*$ satisfies the following criteria:

$$\frac{\nabla f_x(x^*)}{|\nabla f_x(x^*)|} = \frac{\nabla g(x^*)}{|\nabla g(x^*)|} \qquad (3)$$

and $$g(x^*) = 0 \qquad (4)$$

where $\nabla f_x(x^*)$ and $\nabla g(x^*)$ are the first-order derivatives of the PDF and the limit-state function, respectively, with respect to the basic random variables x evaluated at $x^*$.

Because the present iteration procedure for the identification of the MPP is based in part on the concept of the MPPL reliability method (see Khalessi, M. R., Y.-T. Wu, and T. Y. Torng, "A New Most-Probable-Point Search Procedure for Efficient Structural Reliability Analysis," *Proceedings of the 32nd Structures, Structural Dynamics, and Materials Conference,* Part 2, AIAA/ASME/ASCE/AHS/ASC, April 1991, pp. 1295–1304), the following two loose convergent criteria can be also used:

$$|g(x_{j1})| \leq \epsilon_g \qquad (5)$$

where $x_{j1}$ is the MPP of linearized limit-state function $g_j(x)=0$ and $\epsilon_g$ is a tolerance in checking g-function; and $$|\beta_{j1}-\beta_j| \leq \epsilon_\beta \qquad (6)$$

where $\beta_{j1}$ is the distance between $x_{j1}$ (the MPP of $g_j(x)=0$) and the mode, $\beta_j$, is the distance from the intersection point of $MPPL_j$ and the limit-state function to the mode, and $\epsilon_\beta$ is the tolerance in checking $\beta$.

4. Proof of Convergence of Proposed Method

For an optimization problem, any point that satisfies all the constraints is said to be feasible. The set of all feasible points is called the feasible domain. In structural reliability analysis, the feasible domain is equivalent to the failure domain. A feasible search direction $T_o$ based on the following two definition is chosen:

1. A vector $T_o$ is a feasible direction from the point $x_o$ if at least a small step can be taken along it that does not immediately leave the feasible domain.

2. A vector $T_o$ is a useful feasible direction from the point $x_o$ if, in addition to Definition 1, $T_o^T \nabla f_x(x_o) > 0$.

The first definition indicates that $T_o^T \nabla g(x_o) \leq 0$ for a concave limit-state function. These two definitions ensure that point $x_o$ moves forward to the solution $x^*$ along the feasible direction $T_o$.

Figure 3:
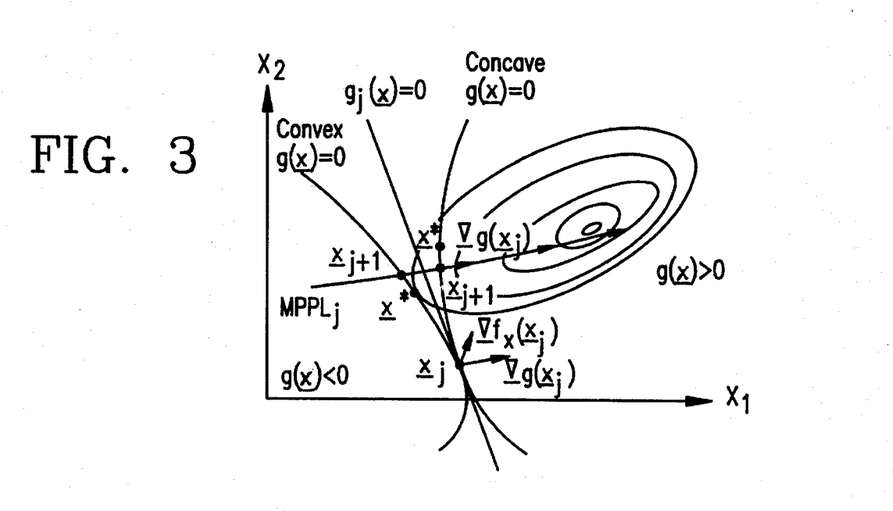
FIG. 3 is an illustration of convergence of the proposed iteration algorithm.

The proof of the convergence of the subject algorithm is illustrated in FIG. 3. The direction starting from the linearization point $x_j$ to the MPP of the linearized limit-state function $g_j(x)=g(x_j)$ (=0, in this figure) is defined as $T_j$. In the case of a concave limit-state function, $T_j$ is a feasible direction because it satisfies the preceding two definitions. Furthermore, because the linearized limit-state surface $g_j(x)=g(x_j)$ is in the failure domain, its corresponding MPP is between the linearized point $x_j$ and $x^*$. Therefore, the intersection point $x_{j+1}$ of $MPPL_j$ and the limit-state surface g(x)=0 is closer to $x^*$ than the linearized point $x_j$. In the case of a convex limit-state surface, $T_j$ does not satisfy the first condition of feasible direction and $x^*$ is located between the linearized point $x_j$ and the MPP of the linearized limit-state surface $g_j(x)=g(x_j)$. However, the intersection point $x_{j+1}$, of the limit-state surface and $MPPL_j$ has a higher PDF than the linearized point $x_j$, since at $x_{j+1}, \nabla g(x_j)//\nabla f_x(x_{j+1})$ and $g(x_{j+1})=0$. Thus, $x_{j+1}$ is closer to $x^*$ than the linearized point, $x_j$. Therefore, from preceding discussion, we conclude that the proposed iteration algorithm will converge to the MPP, $x^*$.

5. Alternative Probability Transformation

Figure 4:
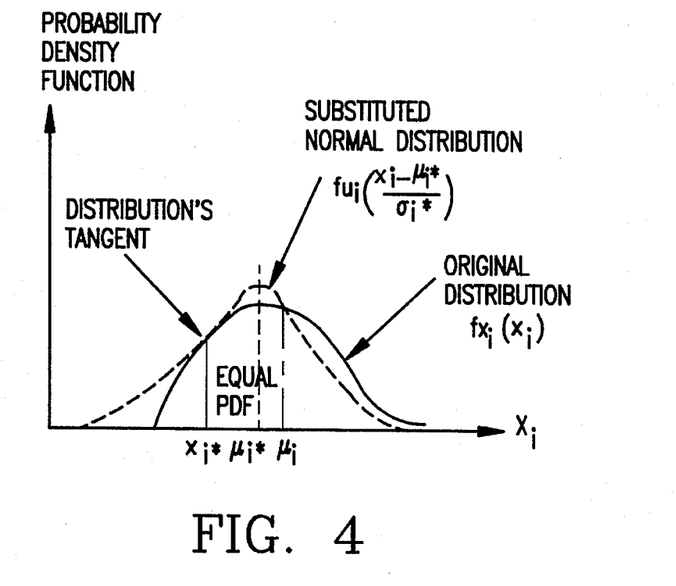
FIG. 4 is an illustration of the alternative probability transformation that preserves the PDF and distribution's tangent at the linearization point.

Once the X-space MPP, $x^*$ is identified, the reliablity can be calculated by using this point. For this purpose, the following alternative probability transformation is derived. According to Horne, M. R., and P. H. Price, "Commentary on the Level II Procedure," in *Rationalization of Safety and Serviceability Factors in Structural Codes,* Report No. 63, Construction Industry Research and Information Association, London, 1977, pp. 209–271, if the probability transformation preserves the PDF and first-order differentials of the PDF at the linearization point, the U-space MPP, $u^*$, will be consistent with the X-space MPP, $x^*$. For independent random variables, this alternative probability transformation is derived as follows: Because the alternative probability transformation preserves the PDF at x*, $$f_{u_i}(u_i^*)du_i + f_{x_i}(x_i^*)dx_i \qquad (7)$$

where $f_{u_i}(u_i)$ denotes the PDF of a standard normal distribution. As shown in FIG. 4, at the X-space MPP, we can replace the distribution of variable $x_i$ with a normal distribution which has an equivalent mean and standard deviation, denoted as $\mu_i^{'*}$ and $\sigma_i^{'*}$, respectively.

That is, we have the following probability transformation:

$$u_i^* = \frac{x_i^* - \mu_i^{'*}}{\sigma_i^{'*}} \qquad (8)$$

Then, Equation 7 becomes $$\frac{f_{U_i}(u_i^*)}{\sigma_i^{'*}} = \frac{1}{\sqrt{2\pi}\ \sigma_i^{'*}} \exp(-\mu_i^{*2}/2) = f_{x_i}(x_i^*)x_i^* \qquad (9)$$

From the preservation of the first-order derivative of the PDF and equations 8 and 9, we have the following:

$$\frac{\partial f_{U_i}(u_i^*)}{\partial u_i} = \frac{\partial f_{U_i}(u_i^*)}{\partial x_i} \ \frac{\partial x_i}{\partial u_i}\ |_{x_i^*} = \frac{\partial f_{x_i}(x_i^*)}{\partial x_i}\ \sigma_i^{'*2} \qquad (10)$$

Eliminating $\sigma_i^{'*}$ between equations 9 and 10 leaves $$\frac{f_{U_i}(u_i^*)}{u_{i*}} = \frac{f_{x_i}^2(x_i^*)}{f_{x_i}'(x_i^*)} \qquad (11)$$

where $f_{x_i}'(x_i^*)$ is the first-order derivative of $f_{x_i}$ evaluated at the X-space MPP, $x_i^*$.

The preceding equation gives an alternative probability transformation for the cases of independent basic random variables. For a given $x_i^*$ the corresponding $u_i^*$ can be computed by the preceding equation. After obtaining $u_i^*$, the equivalent mean, $\mu_i^{'*}$, and standard deviation, $\sigma_i^{'*}$, can be computed from equations 8 and 9, respectively.

By definition, the X-space MPP, x*, and the transferred U-space MPP, u*, have the highest PDF in the failure domain of the original and standard normal space, respectively. Therefore, to prove the consistency of x* and u* through the preceding probability transformation, it is necessary to show that the gradient of the PDF is parallel to the gradient of the limit-state function at both x* and u*. That is, $$\nabla f_x(x^*) = \left\{ \frac{f_x(x^*)}{f_{x_i}(x_i^*)} \ \frac{\partial f_{x_i}(x_i^*)}{\partial x_i} \right\} // \nabla g(x^*) \qquad (12)$$

$$\nabla f_U(u^*) = \left\{ \frac{f_U(u^*)}{f_{U_i}(u_i^*)}\ \frac{\partial f_{U_i}(u_i^*)}{\partial u_i} \right\} // \nabla g(u^*) \qquad (13)$$

From Equation 9, $$f_x(\underline{x}^*) = \frac{f_U(\underline{u}^*)}{\prod_{i=1}^{n} \sigma_i^{'*}} \qquad (14)$$

Equations 9 through 14, after some vector operations, yield $$\nabla f_x(\underline{x}^*) = \frac{1}{\prod_{j=1}^{n} \sigma_j^{'*}} \left\{ \frac{f_U(\underline{u}^*)}{f_{U_i}(u_i^*)}\ \frac{\partial f_{U_i}(u_{i^*})}{\partial u_i}\ \frac{\partial u_i}{\partial x_i}\ |_{x_i^*} \right\} \qquad (15)$$

$$= \frac{1}{\prod_{j=1}^{n} \sigma_j^{'*}} \left[ \frac{\partial u_i}{\partial x_i} \right]_{\underline{x}^*} \nabla f_U(\underline{u}^*)$$

where $$\left[ \frac{\partial u_i}{\partial x_i} \right]_{\underline{x}^*} = \left[ \frac{1}{\sigma_i^{'*}} \right]$$

is the diagonal Jacobian matrix for the independent basic random variables. By the chain rule, $$\nabla g(\underline{x}^*) = \left\{ \frac{\partial g(\underline{u}^*)}{\partial u_i}\ \frac{\partial u_i}{\partial x_i}\ |_{x_i^*} \right\} = \left[ \frac{\partial u_i}{\partial x_i} \right]_{\underline{x}^*} \nabla g(\underline{u}^*) \qquad (16)$$

Equations 15 and 16 show that if $\nabla f_x(x^*) // \nabla g(x^*)$, then $\nabla f_u(u^*) // \nabla g(u^*)$. In other words, this alternative probability transformation yields consistency between x* and u*.

Note that the preceding alternative probability transformation produces a limit-state function in the standard normal space that is different from the one used in the conventional FORM/SORM analyses, which is denoted as $u_R^*$. Therefore, although both u* and $u_R^*$ have the highest PDF in the failure domain in the standard normal space, they are different points.

Similarly, for the case of dependent basic variables with known joint PDF, by using the Rosenblatt's transformation described in Rosenblatt, M., "Remarks on a Multivariate Transformation," *Annals Math. Stat.*, Vol. 23, 1952, pp. 470–472, the following probability transformation can be derived:

$$\frac{f_{U_1}(u_1^*)}{u_1^*} = \frac{f_{x_1}^2(x_1^*)}{f_{x_1}'(x_1^*)} \qquad (17)$$

$$\dots$$

$$\frac{f_{U_2}(u_2^*)}{u_2^*} = \frac{f_{x_2|x_1}^2(x_2^*|x_1^*)}{f_{x_2|x_1}'(x_2^*|x_1^*)}$$

$$\dots$$

$$\frac{f_{U_i}(u_i^*)}{u_i^*} = \frac{f_{X_i|\underline{X}_{i-1}}^2(x_i^*|\underline{x}_{i-1}^*)}{f_{X_i|\underline{X}_{i-1}}'(x_i^*|\underline{x}_{i-1}^*)}$$

$$\dots$$

$$\frac{f_{U_n}(u_n^*)}{u_n^*} = \frac{f_{X_n|\underline{X}_{n-1}}^2(x_n^*|\underline{x}_{n-1}^*)}{f_{X_n|\underline{X}_{n-1}}'(x_n^*|\underline{x}_{n-1}^*)}$$

where $$f_{X_i|\underline{X}_{i-1}}(x_i^*|\underline{x}_{i-1}^*) = \frac{f_{\underline{X}_i}(x_1, \dots, x_i)}{f_{\underline{X}_{i-1}}(x_1, \dots, x_{i-1})} \qquad (18)$$

$$f_{X_i|\underline{X}_{i-1}}'(x_i^*|\underline{x}_{i-1}^*) = \frac{\partial f_{\underline{X}_i}(x_1, \dots, x_i)/\partial x_i}{f_{\underline{X}_{i-1}}(x_1, \dots, x_{i-1})} \qquad (19)$$

As with the conventional Rosenblatt's transformation, the transferred U-space MPP, u*, depends on the ordering of the basic random variables, x. However, because both x* and u* have the highest PDF and they are consistent through the alternative probability transformation, u* can be used in the important sampling technique for evaluating failure probability.

6. Calculation of Failure Probability

Once the transferred U-space MPP, u*, has been located, the strategy used in the conventional FORM/SORM methods can be used to approximate the failure probability which is defined as follows:

$$p_f = \int_{g(\underline{x}) \leq 0} f_x(\underline{x}) d\underline{x} \quad (20)$$

That is, the limit-state surface at the U-space MPP, u*, is replaced with a tangent plane for the FORM method and a quadratic surface for the SORM method. Then failure probability for the FORM method is $$p_f \approx p_{f_1} = \phi(-\beta) \quad (21)$$

where $\beta$ is the distance of the transferred U-space MPP, u*, from the origin in the standard normal space.

The formula for failure probability in the SORM method is given by Tvedt, L., "Distribution of Quadratic Forms in Normal Space—Application to Structural Reliability," *Journal of Engineering Mechanics*, Vol. 116, No. 6, ASCE, June 1990, pp. 1183–1192. It calculates the failure probability by replacing the limit-state surface with a quadratic surface in the standard normal space. That is, $p_f \approx p_{f_2}$, where $p_{f_2}$ equals $$\phi(\beta) Re \left\{ i \sqrt{\frac{1}{\pi}} \int_0^{i\infty} \frac{\exp\left(\frac{(u+\beta)^2}{2}\right)}{u} \prod_{j=1}^{n-1} \frac{1}{\sqrt{1 - \kappa_j u}} du \right\} \quad (22)$$

and $\phi$ is the PDF of a normal distribution, Re is the real part of a complex number, $i = \{-1\}^{1/2}$ and $k_j$ are the main curvatures of the limit-state function at the U-space MPP in the rotated standard normal space. The integration path of the preceding equation is shifted parallel using the saddle point method into one passing through a saddle point, and the trapezoidal rule is applied to compute the integral.

The curvature matrix of the limit-state function in the rotated standard normal space, C, is computed by $$C_{ij} = \frac{(RDR^T)_{ij}}{|\nabla g(\underline{u}^*)|} \quad (23)$$

$$i,j = 1, 2, \ldots, n - 1$$

where R is an orthogonal matrix used to rotate the standard normal U-space to a rotated standard U'-space and D is the second derivative of the limit-state function at u*. R is selected such that the nth row of R is the unit normal of the limit-state function at the U-space MPP, i.e., $-\nabla g(u^*)/|\nabla g(u^*)|$. The Gram-Schmidt algorithm can be used to generate R.

The major effort in the SORM method is computing the curvature matrix of the limit-state function at the transferred U-space MPP. Usually, the finite-difference scheme is directly applied in the rotated standard normal space to compute the curvature matrix, Der Kiureghian, A., H.-Z. Lin, and S.-J. Hwang, "Second-Order Reliability Approximations," *Journal of Engineering Mechanics*, Vol. 113, No. 8, ASCE, 198, pp. 1208–1225. The curvature matrix C in Equation 23 is an n–1×n–1 matrix. A central-difference scheme requires a total of $2(n-1)^2$ computations of the limit-state function (this number is reduced to $n(n+1)/2$, if a forward-difference scheme is used). It is obvious the computation of this curvature matrix must be simplified to perform the SORM analysis in finite-element-based reliability analysis.

In some cases, it is advantageous to compute the second-derivative matrix in the original space and then make the transformation to compute the curvature matrix in the standard normal space. For example, if the limit-state function in the original space is linear, curvatures at the U-space MPP arise only because of nonlinearity in the probability transformation. Therefore, the following improvement is made to reduce computational effort:

$$D_{ij} = \frac{\partial^2 g(\underline{u}^*)}{\partial u_i \partial u_j} = \frac{\partial}{\partial u_j} \left( \frac{\partial g(\underline{x}^*)}{\partial x_k} \frac{\partial x_k}{\partial u_i} \right)_{\underline{x}^*} \quad (24)$$

$$= \frac{\partial^2 g(\underline{x}^*)}{\partial x_k \partial x_l} \frac{\partial x_l}{\partial u_j} \frac{\partial x_l}{\partial u_j} \frac{\partial x_k}{\partial u_i} \bigg|_{\underline{x}^*} + \frac{\partial g(\underline{x}^*)}{\partial x_k} \frac{\partial^2 x_k}{\partial u_i \partial u_j} \bigg|_{\underline{x}^*}$$

From the preceding equation, curvatures of the limit-state function in the U-space are contributed from two parts: the curvatures of the limit-state function in the X-space and the nonlinearility of the probability transformation. Equation 24 requires a full curvature matrix of the limit-state function, that is, an n×n matrix in both X- and U-spaces. Therefore, it is used only in the case where the computation of the curvature matrix requires less finite-element analysis in the X-space than in the U-space. If the second-order derivative of the limit-state function in the X-space in the preceding equation is eliminated, then $$\frac{\partial^2 g(\underline{u}^*)}{\partial u_i \partial u_j} \approx \frac{\partial g(\underline{x}^*)}{\partial x_k} \frac{\partial^2 x_k}{\partial u_i \partial u_j} \bigg|_{\underline{x}^*} \quad (25)$$

The preceding equation shows that only curvatures of the limit-state function in the standard normal space contributed by the nonlinearity of the probability transformation are counted. In other words, the limit-state surface is replaced by a hyper-tangent plane at the X-space MPP, x*. The second order derivative of the probability transformation can be computed by a finite-difference scheme or by tensor analysis. Tensor analysis to compute the curvature matrix is useful in the case of dependent random variables.

The gradient of the limit-state function at the X-space MPP in the preceding equation is available in the iteration procedure to identify the X-space MPP. Therefore, with minor extra work and without extra finite-element analysis, we can obtain an improvement in failure probability over the first-order failure probability (Equation 21).

EXAMPLE

Figure 5:
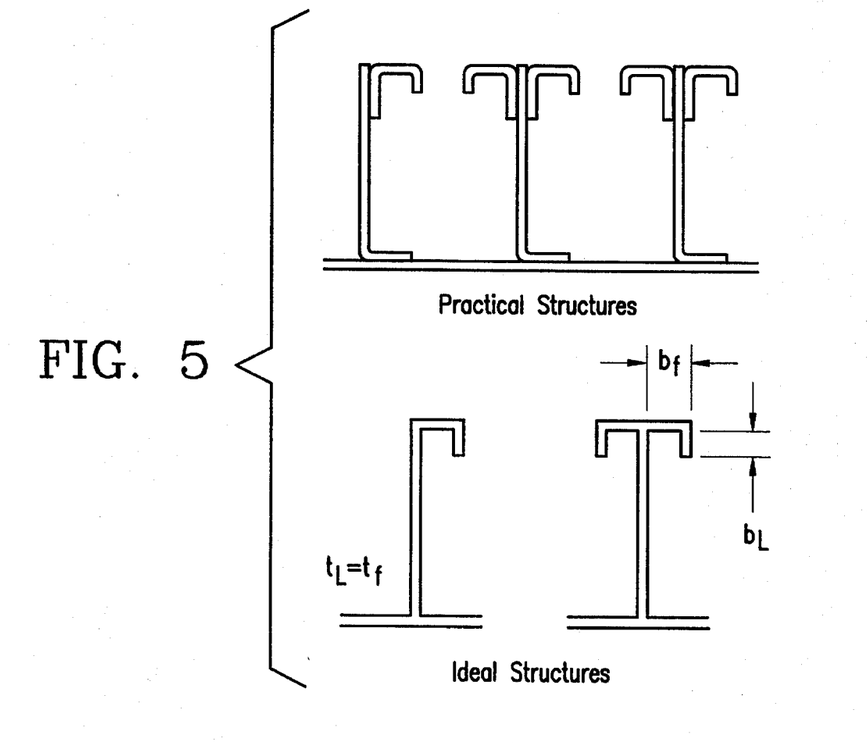
FIG. 5 shows the flanged component used in the Example.
Figure 6:
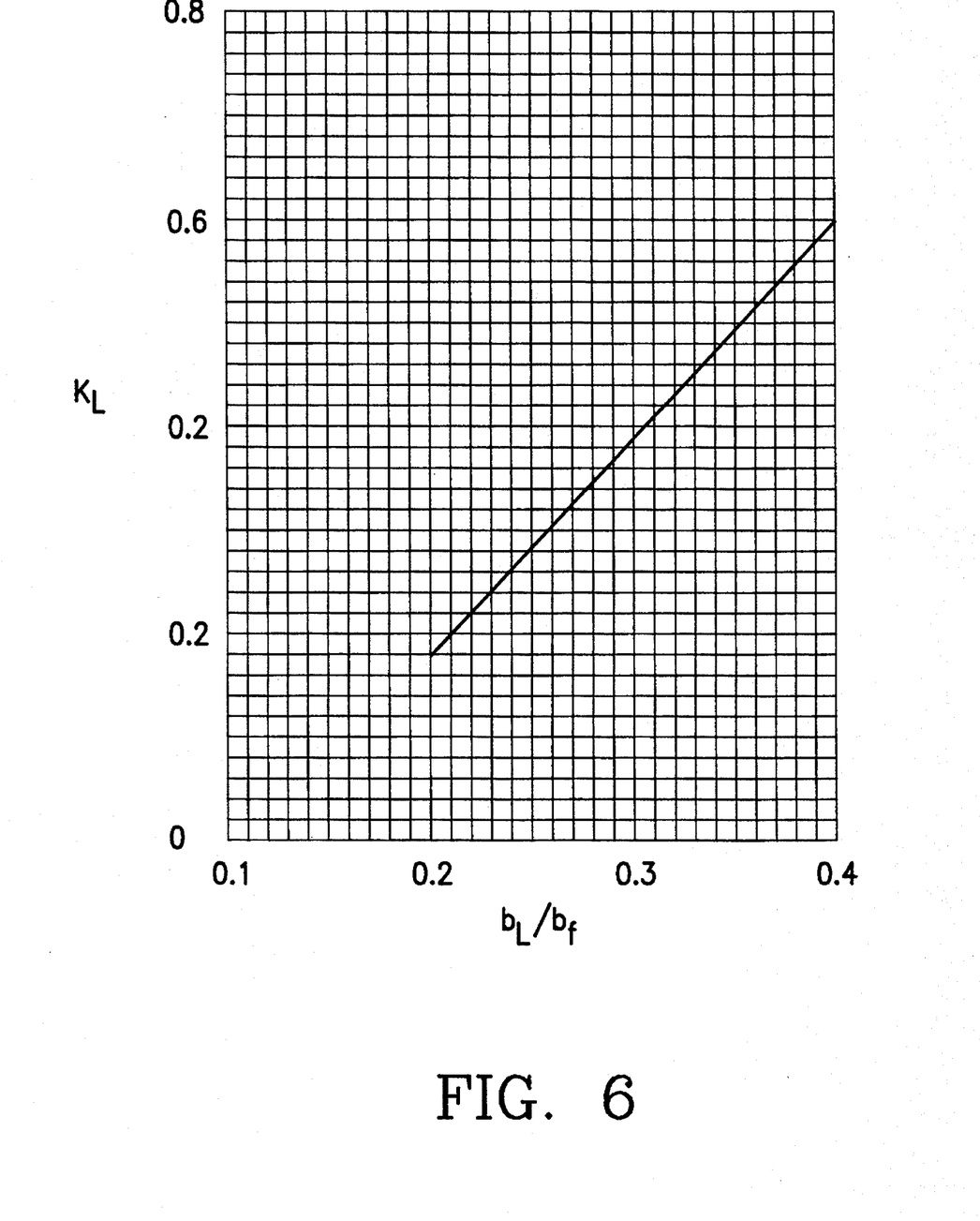
FIG. 6 is a graph illustrating test results of $K_L$ versus $b_L/D_f$.

This is an example of local buckling stress for a flanged component (*Structural Manual*, Vol. 3, Space Systems Division, Rockwell International, September 1974) under longitudinal compression. The limit-state function is $$g(x) = \phi_{cr} - \phi \quad (26)$$

where $\phi_{cr}$ is the local buckling stress for flanges under her ongitudinal compression and $\phi$ is the stress response computed from finite-element analysis. $\phi_{cr}$ can be computed by $$\sigma_{cr} = \frac{\eta K_L \pi^2 E}{12(1-\mu^2)} \left[ \frac{t_L}{b_L} \right]^2 \quad (27)$$

where $\eta$ is the plasticity correction, $\mu$ is Poisson's ratio, E is Young's modulus, $K_L$ is the local buckling stress coefficient, and $t_L$ and $b_L$ are defined in FIG. 5. $K_L$ can be obtained from the chart of $K_L$ versus $b_L/b_f$ shown in FIG. 5, which was determined from test results. $K_L$ can be represented as a regression equation:

$$K_L = c_1 + c_2 \frac{b_L}{b_f} \quad (28)$$

where $c_1$ and $c_2$ are regression coefficients and estimated as $-0.2421$ and $2.1053$, respectively, from FIG. 6. To demonstrate the proposed method, the assumed basic variables x are given in Table 1.

TABLE 1

Statistical Properties of the Basic Random Variables for Example

| Random Variable | Name | Distribution Type | Mean | Standard Deviation |
|---|---|---|---|---|
| $x_1$ | h | Weibull | 2.5 | 0.75 |
| $x_2$ | E | Gamma | $3 \times 10^7$ | $6 \times 10^6$ |
| $x_3$ | m | Gamma | $2.5 \times 10^{-1}$ | $7.5 \times 10^{-2}$ |
| $x_4$ | $t_L$ | Lognormal | $5 \times 10^{-2}$ | $5 \times 10^{-4}$ |
| $x_5$ | $b_L$ | Lognormal | $4.75 \times 10^{-1}$ | $4.75 \times 10^{-2}$ |
| $x_6$ | $b_f$ | Lognormal | 1.45 | $1.45 \times 10^{-2}$ |
| $x_7$ | s | Gamma | $1 \times 10^5$ | $2.5 \times 10^4$ |
| $x_8$ | $c_1$ | Constant | $-2.42113 \times 10^{-1}$ | 0 |
| $x_9$ | $c_2$ | Constant | 2.1053 | 0 |

Convergence criteria from equations 3 and 4 are used in this example. Furthermore, we assume the tolerance for these two criteria as $1 \times 10^{-5}$ and the maximum steps in the quadratic search algorithm for searching g(x)=0 point along $MPPL_j$ as 2. The result is listed in Table 2.

TABLE 2

Results for Example

| Iteration | Number of g(x) | Number of $\nabla g$(x) |
|---|---|---|
| 1 | 4 | 1 |
| 2 | 3 | 1 |
| 3 | 0 | 1 |

Seven limit-state functions and three gradient computations are required to obtain the MPP, x*, with the coordinates (1.039, $2.516 \times 10^7$, $2.213 \times 10^{-1}$, $4.996 \times 10^{-2}$, $4.740 \times 10^{-1}$, 1.450, $1.120 \times 10^5$, $-2.421 \times 10^{-1}$, 2.105). The PDF at x* is $6.646 \times 10^{-8}$.

For comparison, this example was rerun using the HL-RF method and a tolerance value 0.001. Eight limit-state functions and eight gradient computations were used to obtain the conventional U-space MPP, u*. The corresponding inverse coordinates in the X-space were (1.052, $2.594 \times 10^7$, $2.346 \times 10^{-1}$, $4.997 \times 10^{-2}$, $4.794 \times 10^{-1}$, 1.451, $1.170 \times 10^5$, $-2.421 \times 10^{-1}$, 2.105). The PDF at this point is $6.131 \times 10^{-8}$. This shows that the U-space MPP is not the true MPP, and the proposed iteration procedure provides an efficient way to find the X-space MPP without using probability transformation.

The resulting X-space MPP, x*, is then used to compute failure probability by the first-order reliability method (Equation 21), and the simplified second-order reliability method that neglects curvatures of the limit-state function in the X-space (equations 22 and 25). These two methods use the alternative probability transformation (equations 11 and 17) because the X-space MPP is used to compute failure probability. For ease of identification, the last two methods are called FORM/A and Simplified SORM/A. Because FORM/A and Simplified SORM/A do not require computing curvatures of the limit-state function in the X-space, these two methods are very efficient.

Failure probability results for this example using the X-space MPP are listed in Table 3.

TABLE 3

Results of Example

| Method | $P_f$ |
|---|---|
| FORM/A | $1.705 \times 10^{-2}$ |
| Simplified SORM/A | $1.593 \times 10^{-2}$ |

These results are compared with failure probability computed through Monte Carlo simulation, which is $1.616 \times 10^{-2}$, and the corresponding coefficient of variation is $4.93 \times 10^{-2}$ with 25,000 trials. The result of the Monte Carlo simulation can be considered the exact value; therefore, this example shows the efficiency and accuracy of the invented method.

Figure 7:
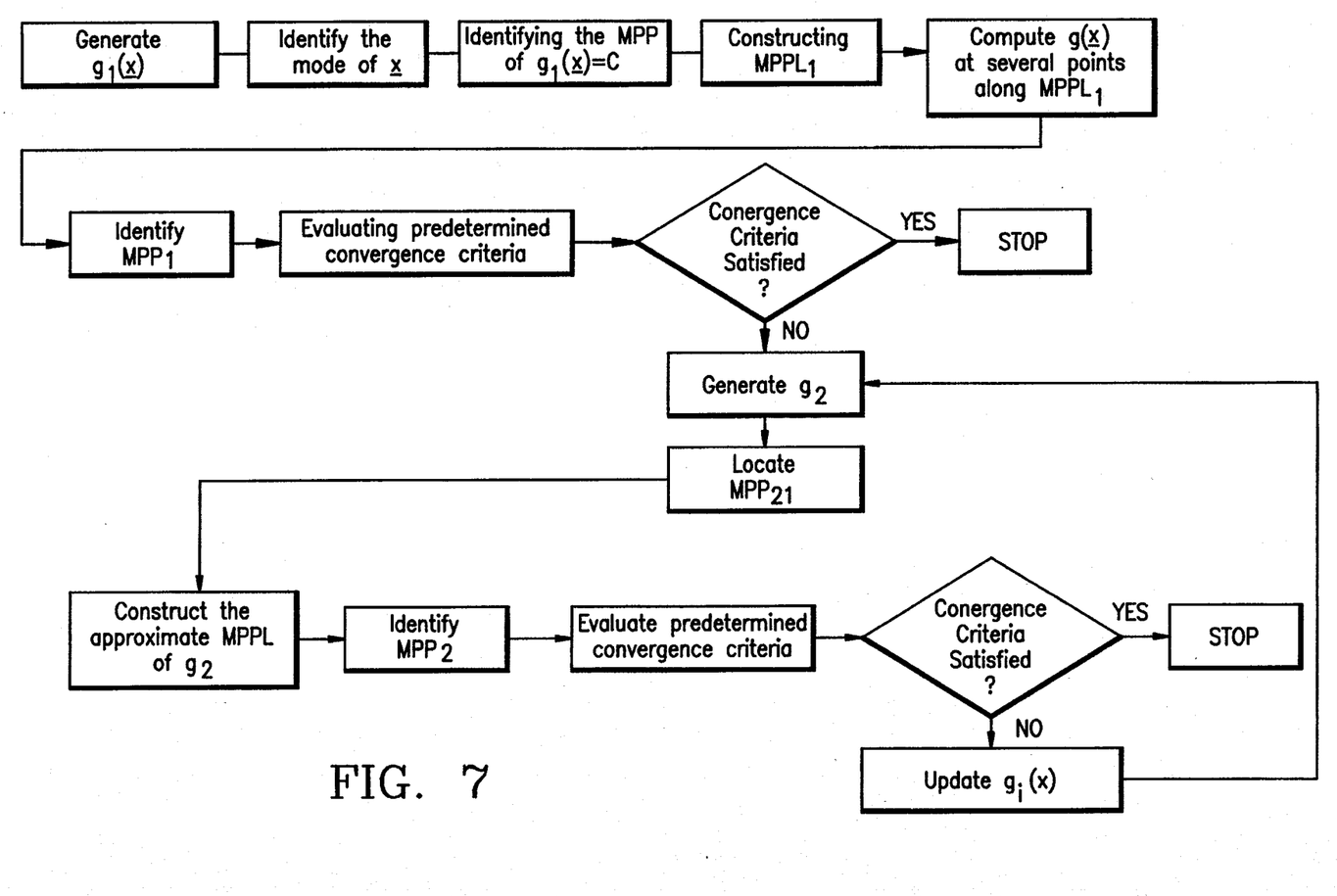
FIG. 7 is flow chart of the method for identifying a Most-Probable-Point (MPP) in original space, of the present invention.

Referring now to FIG. 7, a flow chart of the method for identifying a Most-Probable-Point (MPP) in original space in accordance with the principles of the present invention is illustrated.

Obviously, many modifications and variations of the present invention are possible in light of the above teachings. It is, therefore, to be understood that, within the scope of the appended claims, the invention may be practiced otherwise than as specifically described.

What is claimed and desired to be secured by Letters Patent of the United States is:

1. A method for identifying a Most-Probable-Point (MPP) in original space obviating the need for a probability transformation, for use in first order/second order reliability analysis, comprising, using a standard computer to perform, the steps of:

a) generating $g_1(x) = g(x_1) + \nabla g^T(x_1)(x-x_1)$, where $\nabla$ is the first-order derivative with respect to basic random variables, the linear approximation of a limit-state-function, g(x) about $x_1$, $x_1$ being the median, mean point, or mode of random variables, x of said g(x), g(x) being defined so that $g(x) \leq 0$ denotes a failure set;

b) constructing $MPPL_1$, being defined as the Most-Probable-Point-Locus (MPPL) of $g_1$, $MPPL_1$ being constructed by the steps of:
  i) identifying said mode of x;
  ii) identifying the MPP of $g_1(x)=c$, where c is an arbitrary constant, by solving the following optimization problem:
  maximize $f_x(x)$, a joint probability density function, such that $g_1(x)=0$; and,
  iii) constructing said $MPPL_1$ by connecting said mode of x from step i), above, and the MPPs corresponding to different c's from step ii), above;

c) computing g(x) at several points along $MPPL_1$, establishing a functional relationship between g(x) and the corresponding distance from the mode along $MPPL_1$ and examining global g-function behavior, d) using a quadratic search algorithm with said functional relationship to identify point $MPP_1$ where $MPP_1$ is the intersection of $MPPL_1$ and $g(x)=0$ and, evaluating predetermined convergence criteria, in accordance with the following:

1. $g(x) = 0$ and,

2. $\dfrac{\nabla f_x(x)}{|\nabla f_x(x)|} = \dfrac{\nabla g(x)}{|\nabla g(x)|}$ e) stopping, unless said convergence criteria are not satisfied;

f) generating $g_2$ where $g_2(x)=g(x_2)+\nabla g^T(x_2)(x-x_2)$, the linear approximation of the limit-state-function, $g(x)$ about $x_2=MPP_1$, g) locating $MPP_{11}$, the Most-Probable-Point of $g_2(x)=0$ by solving the following optimization:
 Maximize $f_x(x)$
 such that $g_2(x)=0$;

h) constructing the approximate MPPL of $g_2$, $MPPL_2$, by connecting said mode and said $MPP_{21}$;

i) using said quadratic search algorithm to identify point $MPP_2$, where $MPP_3$ is the intersection of $MPPL_2$ and $g(x)=0$ and evaluating said convergence criteria;

j) stopping, unless said convergence criteria are not satisfied; and, k) updating $g_j(x)$, with the results of the previous iteration, where j=2, 3, . . . , m, where m is the total number of steps required for convergence, and repeating steps f–j, above.

2. A method for calculating the failure probability of a system, $P_f$, by transforming the original (X) most-probable-point (MPP)x*, said x* being defined as the point having the highest probability density function in the failure domain, into the standard normal space, said method for calculating $P_f$, comprising, using a standard computer to perform, the steps of:

a) identifying the standard normal (U)-space MPP, u*, by transforming the X-space MPP, x*, to standard normal space preserving the following properties:
 i) preserve probability density function (PDF) at x*, and
 ii) preserve the distribution tangential of PDF at x*, and, b) using conventional first-/second-order probability approximation techniques to calculate $P_f$ based on the results identified in step a), above.

* * * * *

UNITED STATES PATENT AND TRADEMARK OFFICE
CERTIFICATE OF CORRECTION

PATENT NO. : 5,608,659
DATED : March 4, 1997
INVENTOR(S) : Hong-Zong Lin, Mohammad R. Khalessi It is certified that error appears in the above-indentified patent and that said Letters Patent is hereby corrected as shown below:

Column 13,

Claim 1, paragraph (i), second line "...where $MPP_3$" should read: "...where $MPP_2$".

Signed and Sealed this

Eleventh Day of November, 1997

Attest:

BRUCE LEHMAN

Attesting Officer   Commissioner of Patents and Trademarks